US010184352B2

(12) United States Patent
O'Leary et al.

(10) Patent No.: US 10,184,352 B2
(45) Date of Patent: Jan. 22, 2019

(54) TURBINE SHROUD SEGMENT WITH INTEGRATED COOLING AIR DISTRIBUTION SYSTEM

(71) Applicants: Rolls-Royce North American Technologies, Inc., Indianapolis, IN (US); Rolls-Royce Corporation, Indianapolis, IN (US)

(72) Inventors: Mark O'Leary, Zionsville, IN (US); Daniel K. Vetters, Indianapolis, IN (US); Matthew R. Brandt, Indianapolis, IN (US); Ted J. Freeman, Danville, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 265 days.

(21) Appl. No.: 15/004,436

(22) Filed: Jan. 22, 2016

(65) Prior Publication Data
US 2016/0376921 A1 Dec. 29, 2016

Related U.S. Application Data

(60) Provisional application No. 62/186,114, filed on Jun. 29, 2015.

(51) Int. Cl.
*F01D 25/12* (2006.01)
*F01D 11/08* (2006.01)
(Continued)

(52) U.S. Cl.
CPC .............. *F01D 25/12* (2013.01); *F01D 9/02* (2013.01); *F01D 11/08* (2013.01); *F01D 11/20* (2013.01);
(Continued)

(58) Field of Classification Search
CPC ........ F01D 25/12; F01D 11/20; F01D 25/246; F01D 9/02; F01D 25/005; F01D 11/08;
(Continued)

(56) References Cited

U.S. PATENT DOCUMENTS 3,864,056 A * 2/1975 Gabriel ..................... F01D 5/08
415/116
4,317,646 A * 3/1982 Steel ....................... F01D 11/18
415/116
(Continued)

FOREIGN PATENT DOCUMENTS

| EP | 2728255 A1 | 5/2014 |
|---|---|---|
| JP | 3564167 B2 | 9/2004 |
| WO | 2015023321 A2 | 2/2015 |

OTHER PUBLICATIONS

GE Aviation Jefferies Investor Visit Presentation; May 12, 2014, p. 31-32.
(Continued)

*Primary Examiner* — Eldon Brockman
(74) *Attorney, Agent, or Firm* — Barnes & Thornburg LLP

(57) ABSTRACT

A turbine shroud adapted for use in a gas turbine engine includes a plurality of metallic carrier segments and a plurality of blade track segments mounted to corresponding metallic carrier segments. Cooling air is directed onto the blade track segments to cool the blade track segments when exposed to high temperatures in a gas turbine engine.

17 Claims, 8 Drawing Sheets

(51) Int. Cl.
*F01D 25/00* (2006.01)
*F01D 9/02* (2006.01)
*F01D 11/20* (2006.01)
*F01D 25/24* (2006.01)

(52) U.S. Cl.
CPC ......... *F01D 25/005* (2013.01); *F01D 25/246* (2013.01); *F05D 2220/32* (2013.01); *F05D 2240/11* (2013.01); *F05D 2260/20* (2013.01); *F05D 2260/201* (2013.01); *F05D 2300/6033* (2013.01); *Y02T 50/672* (2013.01); *Y02T 50/676* (2013.01)

(58) Field of Classification Search
CPC ............... F01D 11/24; F05D 2260/201; F05D 2240/11; F05D 2260/20; F05D 2220/32; F05D 2300/6033
See application file for complete search history.

(56) References Cited

U.S. PATENT DOCUMENTS

| | | | |
|---|---|---|---|
| 4,526,226 A * | 7/1985 | Hsia | F01D 5/187 165/109.1 |
| 5,993,150 A | 11/1999 | Liotta et al. | |
| 6,126,389 A | 10/2000 | Burdgick | |
| 6,884,026 B2 | 4/2005 | Glynn et al. | |
| 7,033,138 B2 | 4/2006 | Tomita et al. | |
| 7,044,709 B2 * | 5/2006 | Bruce | F01D 9/04 415/135 |
| 7,306,424 B2 | 12/2007 | Romanov et al. | |
| 7,726,936 B2 | 6/2010 | Keller et al. | |
| 7,950,234 B2 | 5/2011 | Radonovich et al. | |
| 8,118,546 B2 | 2/2012 | Morrison | |
| 8,128,343 B2 | 3/2012 | Schiavo et al. | |
| 8,246,299 B2 | 8/2012 | Razzell et al. | |
| 8,459,042 B2 | 6/2013 | Lohmueller | |
| 8,534,995 B2 | 9/2013 | McCaffrey | |
| 8,740,552 B2 | 6/2014 | Marusko et al. | |
| 8,753,073 B2 | 6/2014 | Albers et al. | |
| 8,790,067 B2 | 7/2014 | McCaffrey et al. | |
| 8,826,668 B2 | 9/2014 | Lee et al. | |
| 8,905,709 B2 | 12/2014 | Dziech et al. | |
| 8,926,270 B2 | 1/2015 | Karafillis et al. | |
| 8,932,009 B2 | 1/2015 | Moraines et al. | |
| 8,998,572 B2 | 4/2015 | Lutjen et al. | |
| 2002/0071762 A1 | 6/2002 | Schroder | |
| 2004/0219009 A1 * | 11/2004 | Marchi | F01D 9/04 415/116 |
| 2005/0158168 A1 * | 7/2005 | Bruce | F01D 9/04 415/173.1 |
| 2008/0206046 A1 | 8/2008 | Razzell et al. | |
| 2013/0156550 A1 | 6/2013 | Franks et al. | |
| 2014/0023490 A1 * | 1/2014 | Hillier | F01D 11/005 415/173.6 |
| 2016/0053624 A1 * | 2/2016 | McCaffrey | F01D 11/22 415/173.1 |
| 2016/0102572 A1 | 4/2016 | O'Leary | |

OTHER PUBLICATIONS

Extended European Search Report, European Application No. 16173210.2-1610, dated Dec. 12, 2016, 7 pages.

* cited by examiner

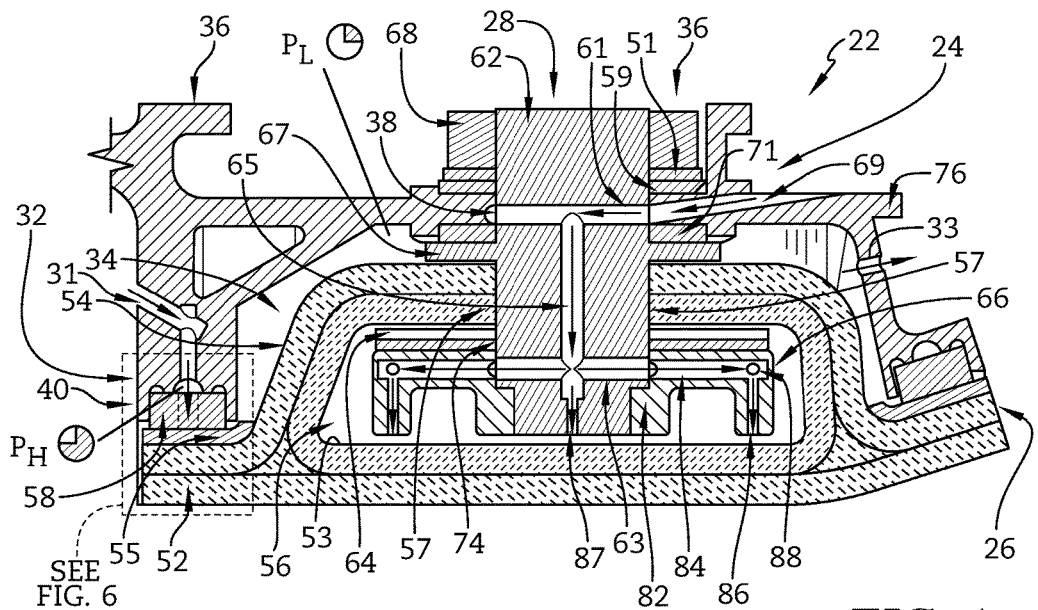
FIG. 5
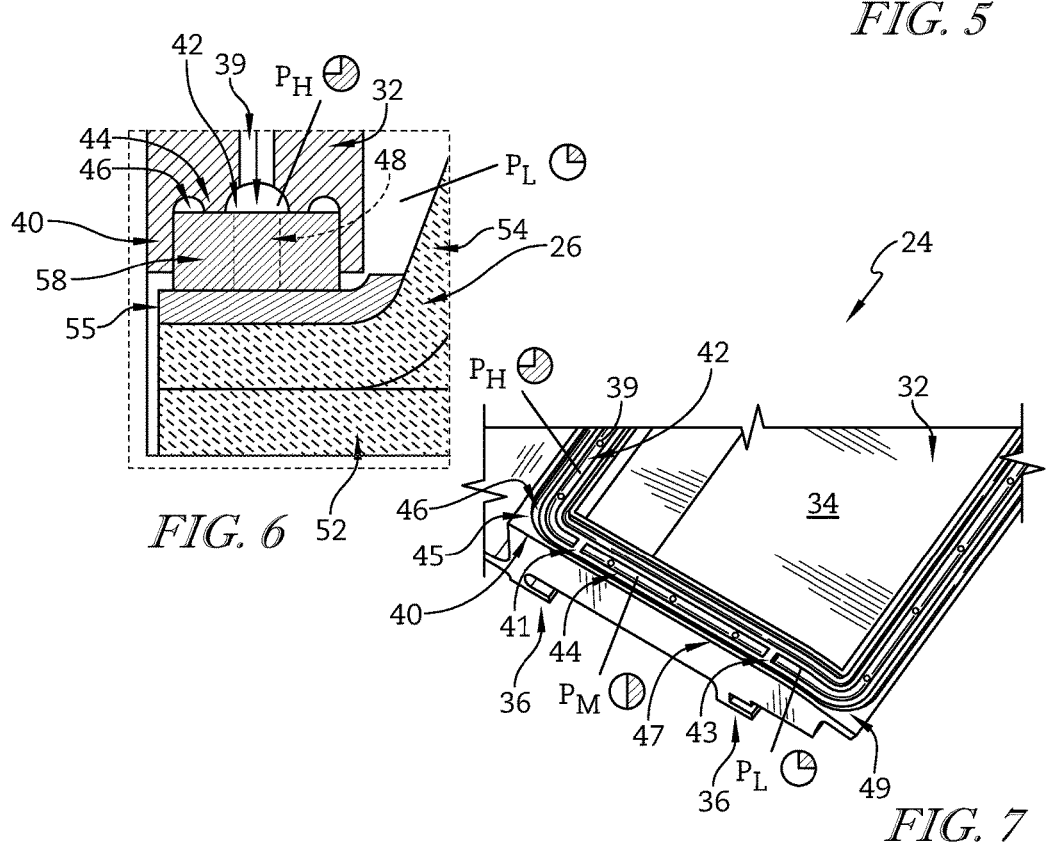
FIG. 6
FIG. 7

TURBINE SHROUD SEGMENT WITH INTEGRATED COOLING AIR DISTRIBUTION SYSTEM

CROSS REFERENCE TO RELATED APPLICATIONS

This application claims priority to and the benefit of U.S. Provisional Patent Application No. 62/186,114, filed 29 Jun. 2015, the disclosure of which is now expressly incorporated herein by reference.

FIELD OF THE DISCLOSURE

The present disclosure relates generally to gas turbine engines, and more specifically to turbine shrouds used to seal around turbine wheels in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials, for example metallic and ceramic composites, that have different characteristics which lead to design challenges.

SUMMARY

The present application discloses one or more of the features recited in the appended claims and/or the following features which, alone or in any combination, may comprise patentable subject matter.

According to the present disclosure, a turbine shroud for use in a gas turbine engine may include a plurality of shroud segments each arranged to extend at least partway around a central axis of the engine. The carrier segment may be formed to define an attachment-receiving space. The blade track segment may be coupled to the carrier segment to close the attachment-receiving space.

In illustrative embodiments, an attachment assembly may be configured to hold the blade track segment on the carrier segment. The attachment assembly may include an attachment post coupled between the blade track segment and the carrier segment and an attachment portion. The attachment portion may be coupled to the attachment post and the attachment post may be configured to deliver a flow of cooling air to the attachment portion. The attachment portion may be configured to direct the flow of cooling air onto a radially-outwardly facing surface of the blade track segment to cool the blade track segment.

These and other features of the present disclosure will become more apparent from the following description of the illustrative embodiments.

BRIEF DESCRIPTION OF THE DRAWINGS

FIG. 5 is a sectional view taken along line 5-5 in FIG. 4 showing that the track-segment coupler includes a support shaft extending through the carrier segment and blade track segment and a flow distributor coupled to the support shaft to hold the blade track segment on the carrier segment and suggesting that cooling air is directed through the track-segment coupler and onto a radially-outward facing side of a runner included in the blade track segment to cool the blade track segment;

FIG. 6 is an enlarged view of the seal segment of FIG. 5 showing that the seal member is received in a channel of the carrier segment and suggesting that high-pressure air is delivered to the channel to block gasses of the flow path from entering the cooling cavity of the turbine shroud segment;

FIG. 7 is a radially-outward looking perspective view of the carrier segment of FIG. 5 showing that the channel includes a groove and a plurality of inlets and suggesting that dams extend across the groove to divide the channel into sections having different pressures;

DETAILED DESCRIPTION

Figure 1:
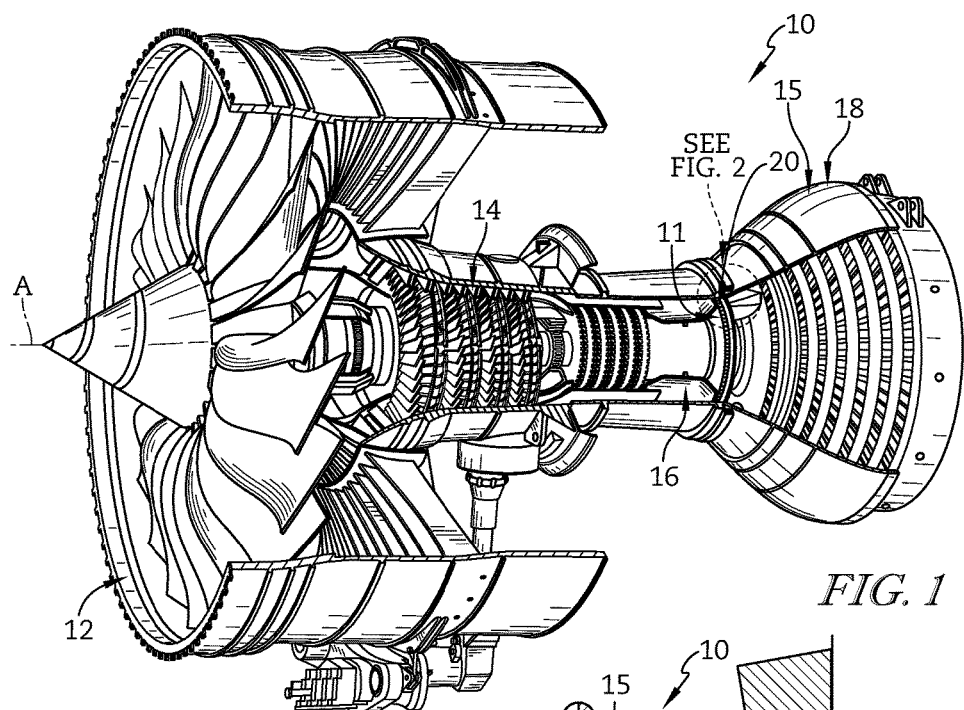
FIG. 1 is a cut-away perspective view of a gas turbine engine showing that the engine includes a fan, a compressor, a combustor, and a turbine, the turbine including a turbine shroud in accordance with the present disclosure positioned radially outward from blades of a turbine wheel assembly as shown in FIG. 2.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis A and drive the compressor 14 and the fan 12.

Figure 2:
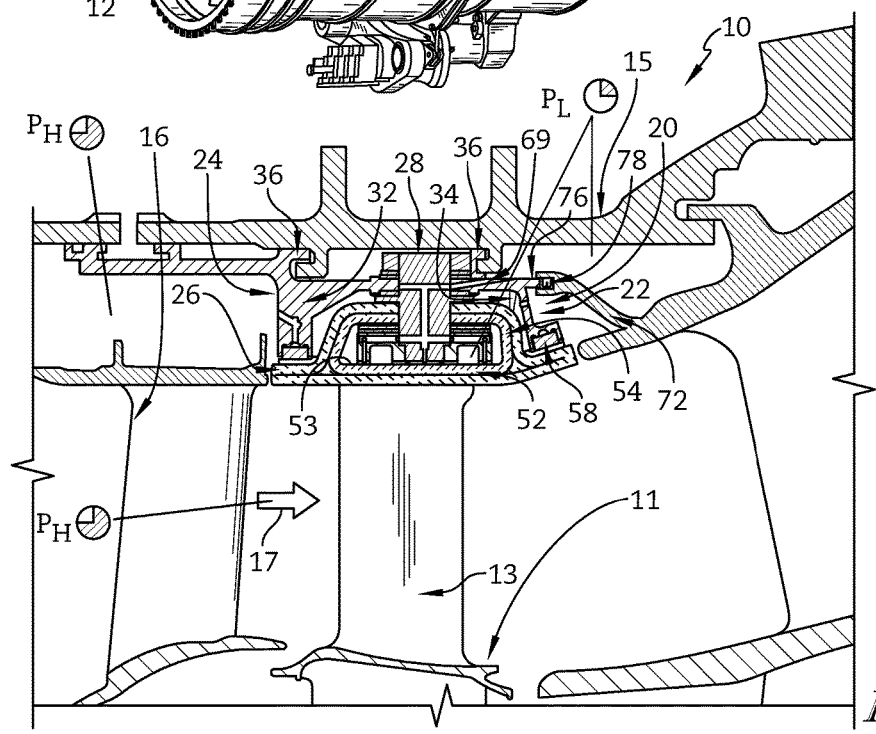
FIG. 2 is a partial sectional view of the gas turbine engine of FIG. 1 showing that the turbine shroud couples with an outer case of the engine to surround the turbine wheel assembly and suggesting that cooling air is delivered to the turbine shroud at a lower pressure than the hot, high-pressure gasses flowing along a flow path of the engine.

The turbine 18 includes at least one turbine wheel assembly 11 and a turbine shroud 20 positioned to surround the turbine wheel assembly 11 as shown in FIGS. 1 and 2. The turbine shroud 20 is coupled to an outer case 15 of the gas turbine engine 10. The turbine wheel assembly 11 includes a plurality of blades 13 coupled to a rotor disk for rotation therewith. The hot, high pressure combustion products from the combustor 16 are directed toward the blades 13 of the turbine wheel assemblies 11 along a flow path 17. The blades 13 are in turn pushed by the combustion products to cause the turbine wheel assembly 11 to rotate; thereby, driving the rotating components of the compressor 14 and/or the fan 12.

Figure 3:
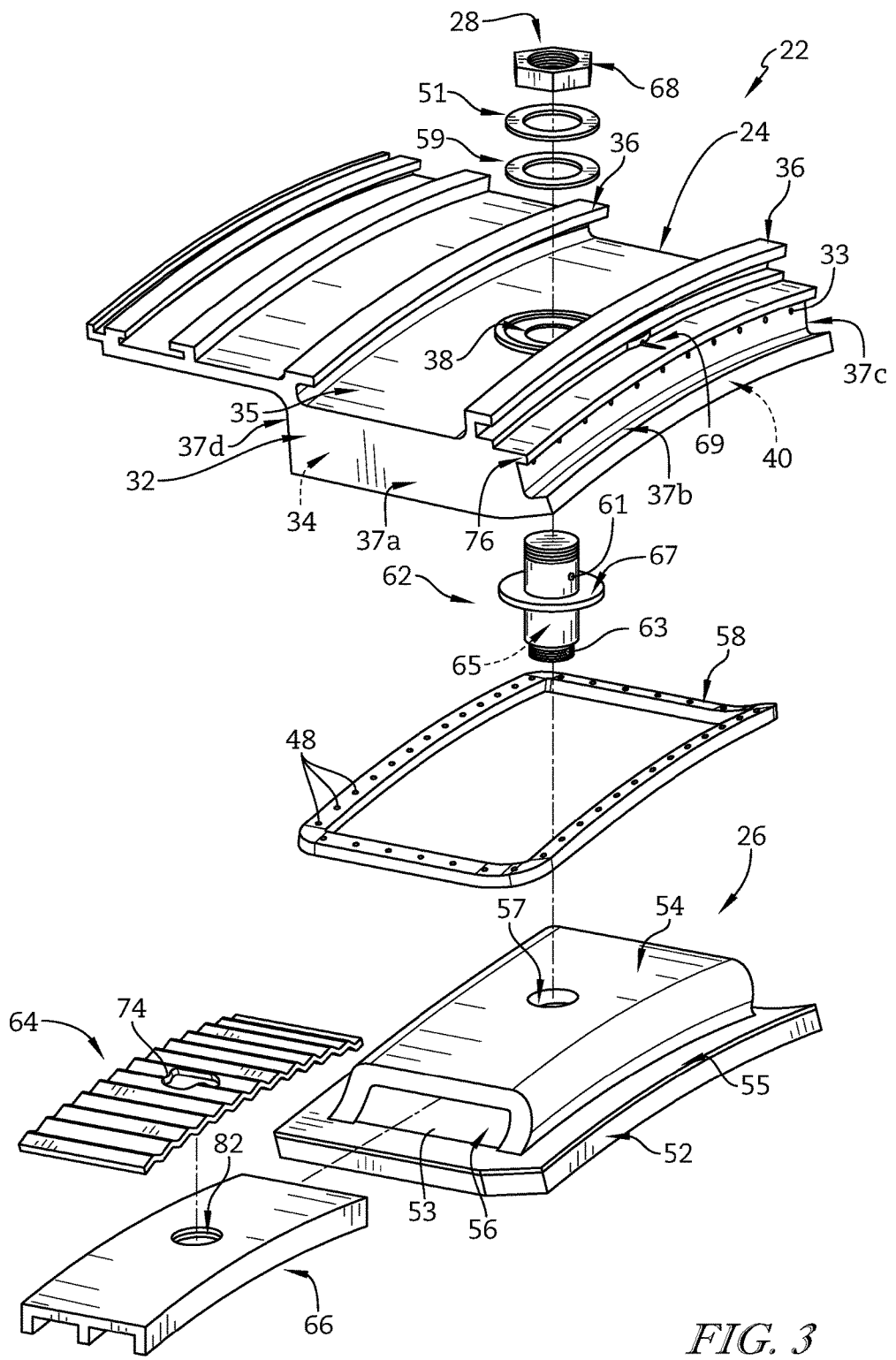
FIG. 3 is an exploded perspective assembly view of one turbine shroud segment included in the turbine shroud of FIG. 2 showing that the turbine shroud segment includes a carrier segment and a blade track segment coupled to the carrier segment by a track-segment coupler.
Figure 4:
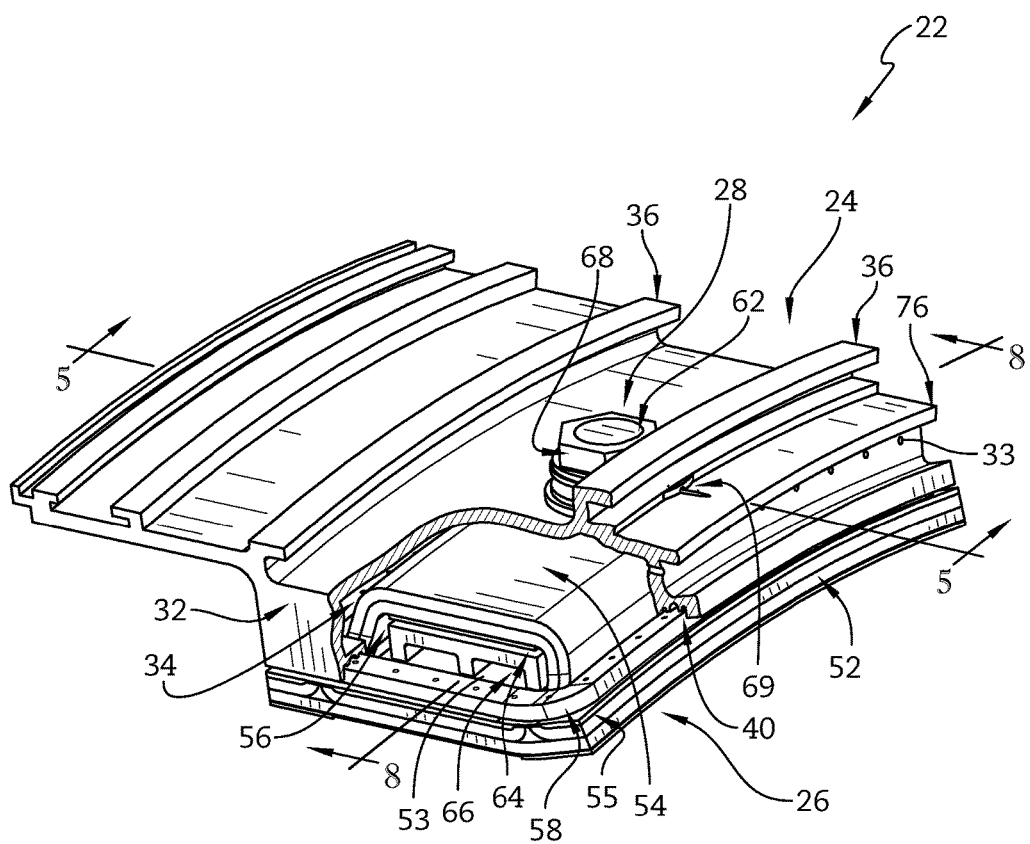
FIG. 4 is a cut-away perspective view of the assembled shroud segment showing that the blade track segment closes a cavity defined by the carrier segment and suggesting that a seal member is engaged with the blade track segment and the carrier segment to seal the cavity.

The turbine shroud 20 extends around the turbine wheel assembly 11 to block combustion products from passing over the blades 13 without pushing the blades 13 to rotate as suggested in FIG. 2. In the illustrative embodiment, the turbine shroud 20 is made up of a number of shroud segments 22, one of which is shown in FIGS. 3 and 4, that extend only part-way around the central axis A and cooperate to surround the turbine wheel assembly 11. The shroud segments 22 are sealed against one another, such as by strip seal members, to provide a continuous turbine shroud 20. In other embodiments, the turbine shroud 20 is annular and non-segmented to extend fully around the central axis A and surround the turbine wheel assembly 11. In yet other embodiments, certain components of the turbine shroud 20 are segmented while other components are annular and non-segmented.

Each shroud segment 22 includes a carrier segment 24, a blade track segment 26, and track-segment coupler 28 (sometimes called an attachment assembly) as shown in FIG. 2. The carrier segment 24 is configured to support the blade track segment 26 in position adjacent to the blades 13 of the turbine wheel assembly 11. The blade track segment 26 is generally concentric with and nested into the carrier segment 24 along the central axis A of the gas turbine engine 10. The track-segment couplers 28 are configured to hold the blade track segment 26 on the carrier and to direct a flow of low-pressure ($P_L$) cooling air toward a radially-outward facing side, hereinafter referred to as a backside 53, of the blade track segment 26.

In the illustrative embodiment, a seal member 58 is positioned between the backside 53 of the blade track segment 26 and the carrier segment 24 to seal a cavity 34 (sometimes called an attachment-receiving space) defined by the carrier segment as suggested in FIG. 2. The seal member 58 creates a continuous seal along a perimeter edge of a runner 52 of the blade track segment 26 as suggested in FIG. 3. The runner 52 is configured to block hot gasses traveling along flow path 17 from passing over the blades 13 without interacting with the blades 13 when the shroud segments 22 are coupled to the outer case 15 as suggested in FIG. 2.

The track-segment coupler 28 biases the blade track segment 26 toward the carrier segment 24 for mutual engagement with the seal member 58 as suggested in FIG. 2. The track-segment couplers 28 are part of a low-pressure cooling system of the engine 10 to direct a flow of low-pressure cooling air into the cavity 34 of the carrier segment 24 to cool the blade track segment 26. The seal member 58 is configured to block leakage of hot, high-pressure gases of flow path 17 into the cavity 34 and may be pressurized with high-pressure ($P_H$) air to further block such leakage as suggested in FIGS. 5 and 6.

In some embodiments, interstage bleed air from the compressor 14 is used to supply the flow of cooling air. Using interstage bleed air to cool the turbine shroud segments 22 may provide a reduction in engine Specific Fuel Consumption (SFC), in that there is less work in producing interstage compressor bleed air compared to compressor discharge air and less air can be used because it is cooler. Interstage compressor bleed air is also lower pressure, cooler, and less parasitic than compressor discharge air when used to cool the blade track segments 26. For example, the low-pressure cooling air may be at a lower pressure than the air in the flow path 17 at the fore end of the turbine section where the shroud 20 is located, but at a higher pressure than the air in the flow path 17 aft of the turbine section after work has been done on the turbine wheel 11.

In the illustrative embodiment, each of the carrier segments 24 includes a body 32 formed to define the cavity 34 and case hangers 36 coupled to the body 32 as suggested in FIGS. 2 and 3. The body 32 includes a mount plate 35 and receiving walls 37a, 37b, 37c, 37d extending radially inward from the mount plate as suggested in FIG. 4. The mount plate 35 and receiving walls 37a, 37b, 37c, 37d cooperate to define the cavity 34. The case hangers 36 are spaced apart from one another and couple the carrier segments 24 to the outer case 15 of the engine 10 as shown in FIG. 2. The track-segment couplers 28 extend through the body 32 and are configured to pass the flow of cooling air into the cavity 34.

Each blade track segment 26 includes a runner 52 defining the backside 53 and a bridge 54 (sometimes called an attachment portion or box) extending radially outward from and circumferentially along the runner 52 as shown in FIG. 3. An internal cooling cavity 56 is defined between the bridge 54 and runner 52. In the illustrative embodiment, a layer 55 of Environmental Barrier Coating (EBC) extends around the perimeter edge of the runner 52 on the backside 53. The EBC layer 55 may provide a sealing surface maximize sealing between the seal member 58 and blade track segment 26. The EBC also functions to resist overcooling of the perimeter edge of the blade track segment 26 due to seal leakage. Overcooling can lead to higher thermal gradients across the blade track segment 26. This can be important where ceramic-matrix composite (CMC) materials are used since CMC has lower stress allowables than, for example, a nickel based alloy.

The track-segment coupler 28 engages with the bridge 54 and the body 32 to hold the blade track segment 26 on the carrier segment 24 as suggested in FIG. 2. The track-segment coupler 28 includes a support shaft 62 (sometimes called an attachment post), a flow distributor 66 (sometimes called an attachment support), and a track biaser 64 (sometimes called a load distributor) as suggested in FIG. 3. A radially outer portion of the support shaft 62 extends through an opening 38 (sometimes called a post hole) formed through the body 32 of the carrier segment 24 and engages with a nut 68 to hold the support shaft 62 on the carrier segment 24. In the illustrative embodiment, the nut 68 and support shaft 62 engage by a threaded connection, though other connections are possible.

In some embodiments, a washer 51 and a gasket 59 are positioned between the nut 68 and body 32 to seal the opening 38 around the support shaft 62 as suggested in FIG. 3. In the illustrative embodiment, a flange 67 of the support shaft 62 engages with the body 32 and cooperates with the nut 68 to hold the support shaft 62 in place relative to the carrier segment 24 as suggested in FIG. 5. In some embodiments, a gasket 71 is positioned between the flange 67 and body 32 to seal the opening 38 around the support shaft 62.

The track biaser 64 and flow distributor 66 extend into the internal cooling cavity 56 of the blade track segment 26 as suggested in FIG. 3. The bridge 54 of the blade track segment 26 is formed to include an opening 57 (sometimes called an attachment hole) configured to receive a radially inner portion of the support shaft 62. The track biaser 64 is formed to include an aperture 74 also configured to receive the radially inner portion of the support shaft 62. The radially inner portion of the support shaft 62 extends through the opening 57 and the aperture 74, and engages with a shaft receiver 82 of the flow distributor 66. In some embodiments, the support shaft 62 and shaft receiver 82 engage by a threaded connection, though other connections are possible. For example, the support shaft 62 and shaft receiver 82 may be brazed or welded together. In some embodiments, the support shaft 62 engages with the flow distributor 66 prior to coupling with the carrier segment 24.

When assembled, the track-segment coupler 28 is configured to hold the blade track segment 26 on the carrier segment 24 as suggested, for example, in FIG. 4. The track biaser 64 is forced into engagement with the bridge 54 by the flow distributor 66 and support shaft 62 to bias the blade track segment 26 toward the carrier segment 24. The track biaser 64 is configured to maintain engagement of the blade track segment 26 and carrier segment 24 with the seal member 58 during operation of the engine 10. For example, temperature fluctuations may cause the blade track segment 26 and carrier segment 24 to thermally expand or contract. Depending on the material, the blade track segment 26 and carrier segment 24 may expand or contract at different rates. The track biaser 64 accounts for the difference in expansion or contraction to maintain sealing engagement of the components.

The track biaser 64 may take many forms, such as coil, leaf, wave, or torsional springs for example. In the illustrative embodiment, the track biaser 64 is a wave spring extending along the flow distributor 66 as suggested in FIG. 8. The track biaser 64 fills a gap between the flow distributor 66 and bridge 54 of the blade track segment 26 to space the flow distributor 66 from the bridge 54. The wave spring track biaser 64 is formed to include peaks and valleys. A stiffness of the track biaser 64 may be adjusted based on the frequency (i.e., distance between adjacent peaks) and/or the amplitude (i.e., natural radial distance between adjacent peaks and valleys) of the track biaser 64.

Figure 9:
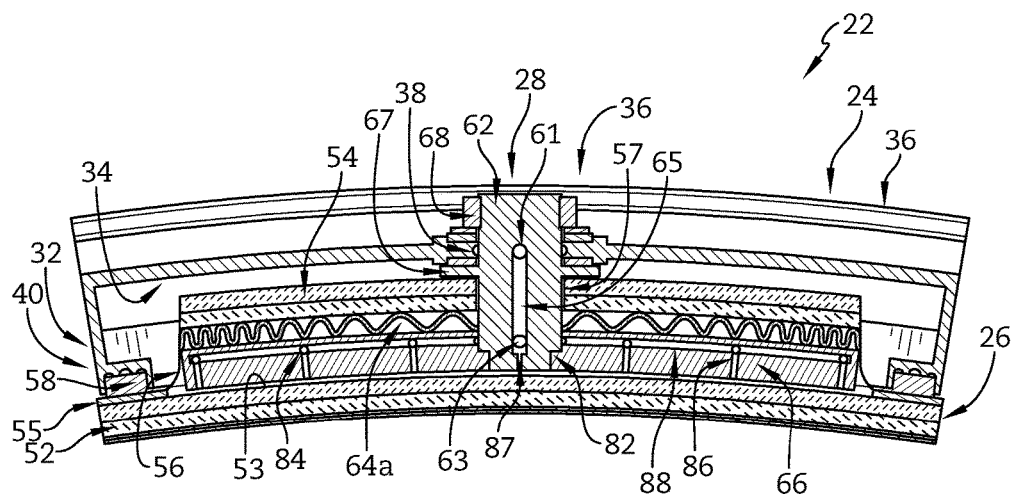
FIG. 9 is a view similar to FIG. 8 showing an alternative embodiment of a track biaser, provided illustratively by a wave spring with varying frequency and amplitude.
Figure 10:
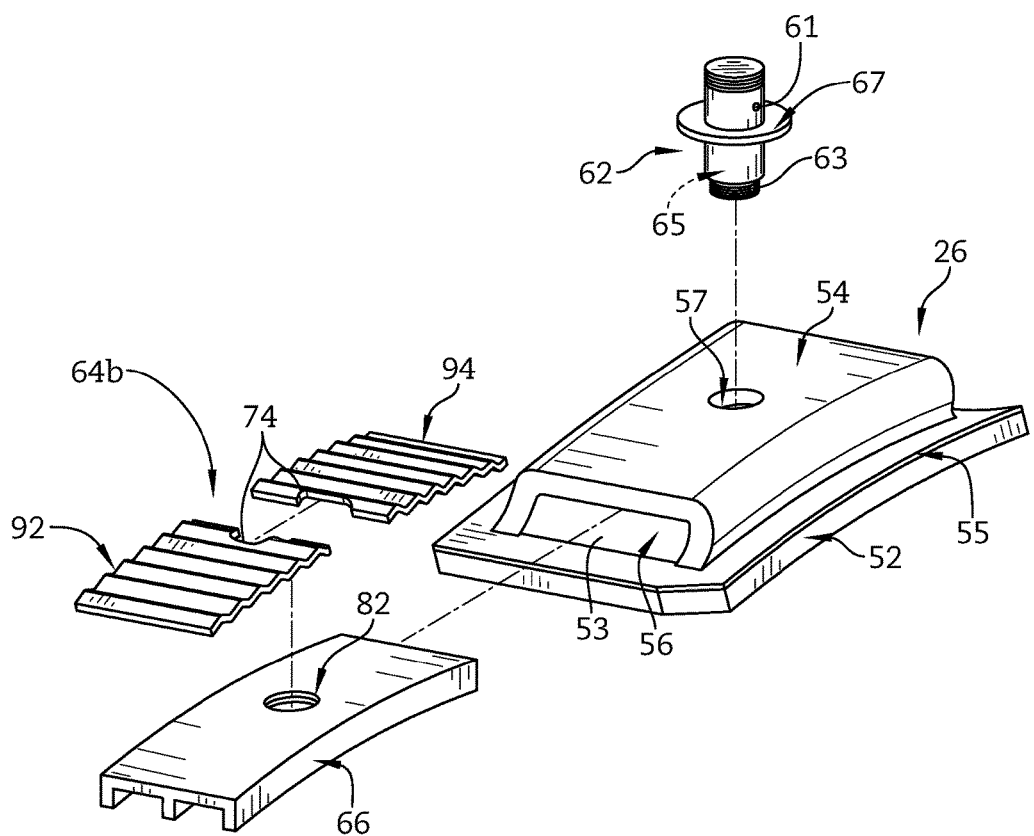
FIG. 10 is a view similar to FIG. 3 showing an alternative embodiment of a track biaser, provided illustratively by two wave springs.

In one example, another embodiment of a track biaser 64a is shown in FIG. 9. The track biaser 64a has a longer wavelength (i.e., less stiff) near the support shaft 62 and a shorter wavelength (i.e., more stiff) near the opposing circumferential ends of the track biaser 64a. Yet another embodiment of a track biaser 64b is shown in FIG. 10. The track biaser 64b includes a first half 92 and a second half 94 which each have cooperating notches to define the aperture 74 for receiving the support shaft 62. Splitting the track biaser 64b into two halves 92, 94 reduces localized stresses on the bridge 54 around the support shaft 62.

The seal member 58 is received in a channel 40 of the carrier segment 24 to maintain alignment of the seal member 58 around the perimeter edge of the runner 52 as suggested in FIGS. 4 and 5. In the illustrative embodiment, the channel 40 is generally aligned along the EBC layer 55 of the blade track segment 26 to position the seal member 58 for engagement therewith. The channel 40 includes a pair of platforms 44 spaced apart from one another to define a groove 42 as suggested in FIG. 6. In some embodiments, reliefs 46 are formed along the platforms 44 opposite of the groove 42.

High-pressure ($P_H$) air (sometimes called buffer air) is fed through one or more inlets 31 (sometimes called a buffer air passageway) and one or more ports 39 to fill the groove 42 and distribute the high-pressure air along the seal member 58 as suggested in FIGS. 5 and 6. In the illustrative embodiment, the seal member 58 includes a plurality of passages 48 (sometimes called bleed holes) extending radially through the seal member 58 as suggested in FIGS. 3 and 6. In some embodiments, the passages 48 are each aligned with an inlet 31.

During normal operation of engine 10, the seal member 58 blocks gasses traveling along the flow path 17 from entering the cavity 34, and the high-pressure air in the groove 42 is dead-headed against the seal member 58 to minimize the SFC of the engine 10. If the seal formed by the seal member 58 is broken, the high-pressure air in the groove 42 would then flow through the passages 48 to drive the gasses back into the flow path 17. The platforms 44 define narrow faces to establish a high contact pressure on the seal member 58 to contain the high-pressure air in the groove 42.

The high-pressure air is continuously supplied through the inlet 31 to the groove 42 and is at a higher pressure than the gasses in the flow path 17 to block entry of the hot gasses into the turbine shroud 20 as suggested in FIG. 5. In some embodiments, the groove 42 is divided into sections 45, 47, 49 by forming dams 41, 43 in the groove 42 between the platforms 44 as suggested in FIG. 7. The groove 42 may be divided such that each section 45, 47, 49 is pressurized corresponding to the pressure of the gasses in the flow path 17 at a similar axial location. The location of the ports 39 may vary depending on the sealing arrangement desired. For example, in some embodiments, the ports 39 are only positioned along a leading edge of the carrier segment 24. In some embodiments, the ports 39 are positioned along a leading edge and axially along circumferential edges of the carrier segment 24 aft of the leading edge but forward of the trailing edge of the carrier segment. In some embodiments, the ports 39 are located all the way around the cavity 34. Other locations for the ports 39 are also contemplated.

In one example, the gasses in the flow path 17 fore of the turbine shroud 20 may be at a high-pressure, and section 45 of groove 42 is correspondingly at a high-pressure ($P_H$). The gasses in the flow path 17 between the fore and aft ends of the turbine shroud 20 may be at a medium-pressure, and section 47 of groove 42 is correspondingly at a medium-pressure ($P_M$). The gasses in the flow path 17 aft of the turbine shroud 20 may be at a low-pressure, and section 49 of groove 42 is correspondingly at a low-pressure ($P_L$).

In some embodiments, the pressure in the sections 45, 47, 49 of the groove 42 is some margin above the pressure in the flow path 17 at a similar axial location to prevent gasses in the flow path 17 from entering the cavity 34. For example, the sections 45, 47, 49 may be at a pressure about 5% to about 10% above the pressure in the flow path 17 at a similar axial location. The cavity 34 may be at a pressure about 5% to about 10% above the pressure in the flow path 17 at the aft end of the turbine shroud 20. This enables lower internal cavity pressure and makes the system more robust to seal leakage flows.

Low-pressure ($P_L$) cooling air flows through the track-segment coupler 28 to impinge on the backside 53 of the blade track segment 26 as suggested in FIG. 5. The support shaft 62 includes an outer opening 61 and an inner opening 63 spaced radially inward of the outer opening 61. A passageway 65 interconnects the outer opening 61 with the inner opening 63. The flange 67 extends around a perimeter of the support shaft 62 between the outer and inner openings 61, 63. When assembled, the flow of low-pressure cooling air enters through a port 69 formed through the body 32 of the carrier segment 24 and into the outer opening 61. The flow of low-pressure cooling air flows through the passageway 65 and out of the inner opening 63 into the flow distributor 66.

Figure 8:
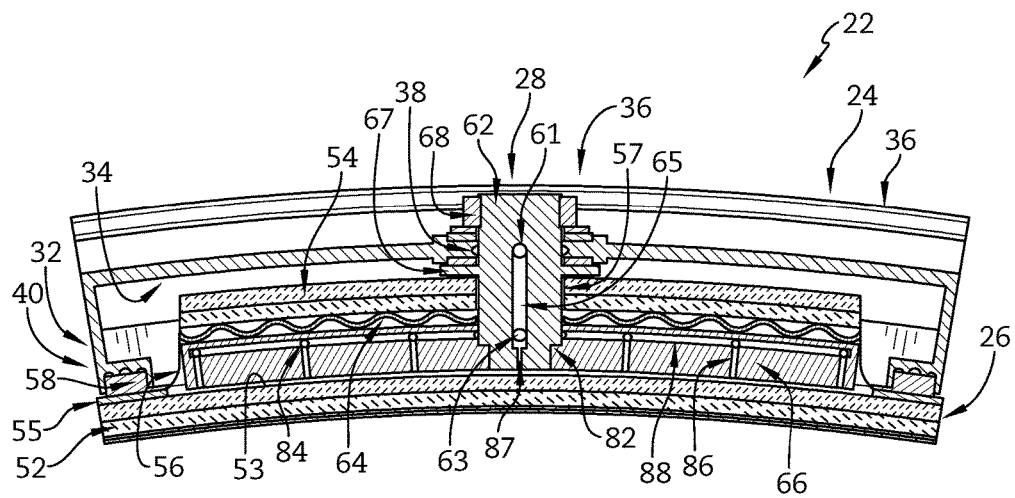
FIG. 8 is a sectional view taken along line 8-8 in FIG. 4 showing that a track biaser, provided illustratively by a single wave spring, is engaged between the flow distributor and the blade track segment and suggesting that the track biaser forces the blade track segment radially outward against the seal member.

The flow distributor 66 is configured to distribute the flow of low-pressure cooling air along the blade track segment 26 to be impinged on the backside 53 as suggested in FIGS. 5 and 8. The flow distributor 66 includes flow channels 84 formed internally and circumferentially spaced along the flow distributor 66. The flow channels 84 are connected by distribution channels 88. In the illustrative embodiment, at least some of the flow channels 84 are aligned with the inner opening 63 of the support shaft 62 to receive the flow of cooling air. In some embodiments, annular grooves are formed in the carrier segment 24 and flow distributor 66 to align with the outer opening 61 and inner opening 63, respectively. The annular grooves may allow cooling air to flow around the support shaft 62 such that the outer opening 61 and inner opening 63 may fluidly communicate with the port 69 and the flow channels 84 even if misaligned therewith.

A plurality of impingement holes 86 are formed in the flow distributor 66 to direct the flow of cooling air in the flow channels 84 toward the backside 53 of the blade track segment 26. An impingement hole 87 is also formed at the inner end of the support shaft 62 to direct and impinge cooling air onto the backside 53 of the blade track segment 26. In the illustrative embodiment, the impingement holes 86, 87 are configured to direct the flow of cooling air in a radially inward direction toward the runner 52 of the blade track segment 26. In some embodiments, the impingement holes 86, 87 are configured to direct the flow of cooling air toward the runner 52 at an angle relative to the radial direction.

As the cooling air flows through the track-segment coupler 28, the cavity 34 of the carrier segment 24 becomes pressurized as suggested in FIG. 5. In the illustrative embodiment, cooling air discharge ports 33 are formed through the body of the carrier segment 24 along an aft side of the shroud segment 22 to allow the used cooling air to escape from the cavity 34 and flow into the primary flow path 17 through the engine 10. In some embodiments, the discharge ports may be formed through the seal member 58 or the blade track segment 26 along the aft side of the shroud segment 22. In the illustrative embodiment, an extension 72 of the carrier segments 24 cooperates with an arm 72 coupled to the outer case 15 such that un-used cooling air flowing into port 69 is separated from used cooling air flowing out of the discharge ports 33 as suggested in FIG. 2. A seal member 78 may be positioned to seal against the arm 72 and the extension 78.

The blade track segments 26 are illustratively formed from ceramic-containing materials as suggested in FIG. 5. In some embodiments, the blade track segments 26 are formed from ceramic-matrix composite materials (particularly silicon-carbide/silicon-carbide ceramic-matrix composite materials). The carrier segments 24 and track-segment couplers 28 are illustratively formed from metallic materials, such as a Ni alloy for example. The seal member 58 and gaskets 59, 71 are illustratively formed from Mica.

Figure 11:
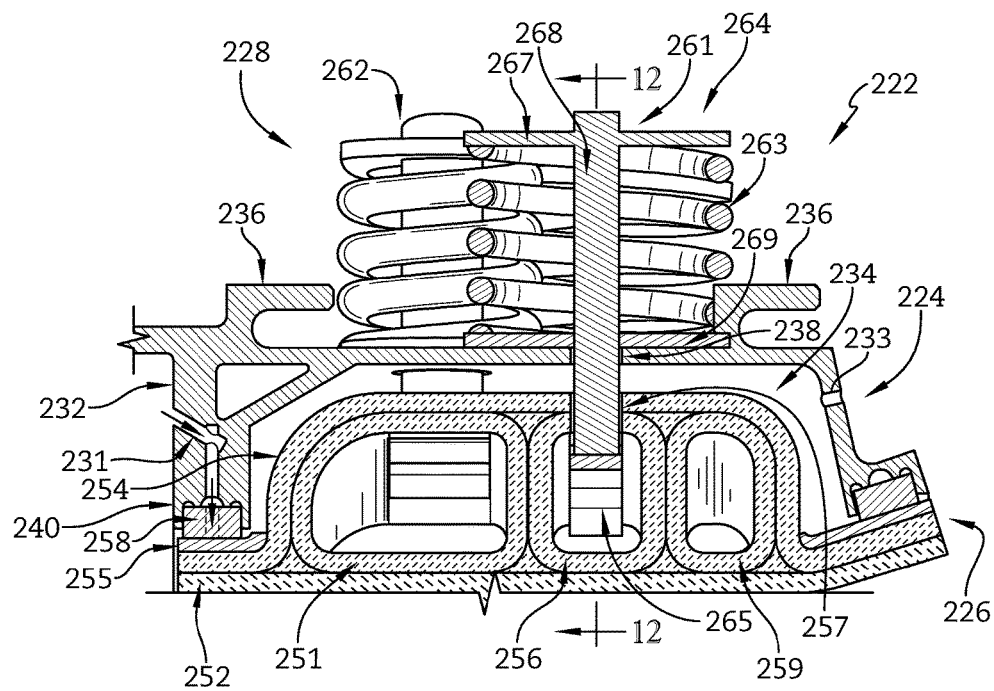
FIG. 11 is a sectional view of another embodiment of a turbine shroud segment for use in the engine of FIG. 1 showing that the turbine shroud segment includes a carrier segment and a blade track segment coupled to the carrier segment by a track-segment coupler.
Figure 12:
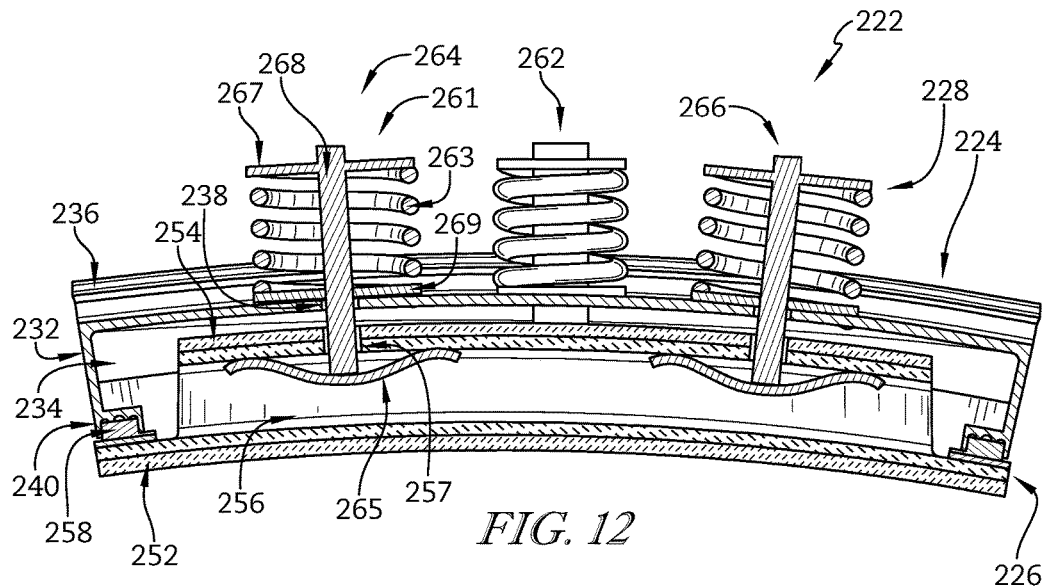
FIG. 12 is a sectional view taken along line 12-12 in FIG. 11 showing biasing springs included in the shroud segment.

Another embodiment of a track-segment coupler 228 as part of a turbine shroud segment 222 is shown in FIGS. 11 and 12. A carrier segment 224 of the turbine shroud segment 222 is similar to the carrier segment 24, and similar numbering in the 200 series is used to identify common elements except as further detailed below. The shroud segment 222 includes the carrier segment 224, a blade track segment 226, and the track-segment coupler 228.

The blade track segment 226 includes a runner 252, a bridge 254 (sometimes called an attachment portion or box), and tubes 251, 256, 259 as suggested in FIG. 11. The bridge 254 and tubes 251, 256, 259 each extend radially outward from and circumferentially along the runner 252 as suggested in FIGS. 11 and 12. The tubes 251, 256, 259 are positioned between the bridge 254 and the runner 252 and define internal cavities.

In the illustrative embodiment, the track-segment coupler 228 (sometimes called an attachment assembly) includes three track biasers 262, 264, 266 as suggested in FIG. 12. Track biaser 264 will be described in detail, which applies equally to the other track biasers 262, 266. Track biaser 264 includes a stem 261 (sometimes called an attachment post), a spring 263 (sometimes called a spring member), and a clip 265 (sometimes called an attachment support). The stem 261 includes a shaft 268 and a flange 267 extending around a perimeter of the shaft 268.

The shaft 268 of the stem 261 extends through an opening 238 of the carrier segment 224 and an opening 257 (sometimes called an attachment hole) of the blade track segment 226 as shown in FIG. 12. In some embodiments, a gasket 269 engages with the carrier segment 224 to seal the opening 238. The clip 265 is coupled to a radially inner end of the shaft 268 and is positioned inside the tube 256. The spring 263 is configured to engage with the flange 267 of the stem 261 to bias the stem 261 radially outward. The clip 265 is configured to engage with the tube 256 to force the blade track segment 226 against a seal member 258 as the spring 263 biases the stem 261 outward. In the illustrative embodiment, the clip 265 is yoke-shaped and contacts the tube 256 at locations spaced apart from the opening 257. Whereas the track biasers 264, 266 are associated with the tube 256, track biaser 262 is associated with the tube 251 as suggested in FIG. 11. Spring 263 is illustratively shown as a helical compression spring. In some embodiments, other springs are used, such as a machined spring or other spring shape having a low stiffness.

The track biasers 262, 264, 266 are circumferentially spaced from one another to provide support and sealing pressure along the blade track segment 226 as suggested in FIG. 12. Similarly, the track biasers 264, 266 are axially spaced from the track biaser 262 to provide support and sealing pressure across the blade track segment 226 as suggested in FIG. 11. The track biasers 262, 264, 266 are compliant to maintain support even during relative thermal expansion or contraction of the components of the shroud segment 222. Positioning a majority of the track-segment coupler 228 components outside of a cavity 234 (sometimes called an attachment-receiving space) of the carrier segment 224 may maximize temperature control thereof and allow a height of the bridge 254 to be minimized.

Figure 13:
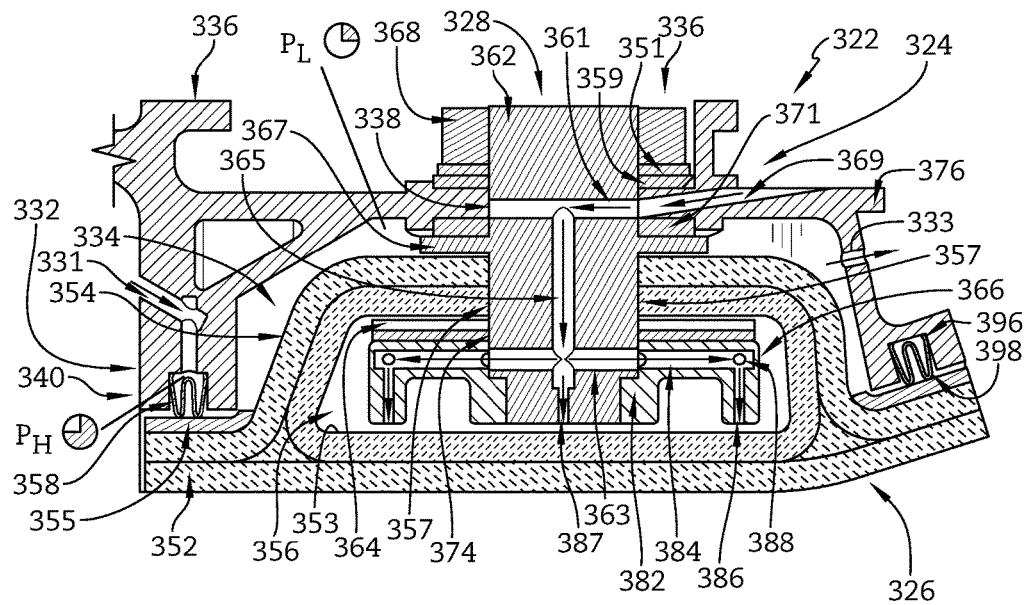
FIG. 13 is a view similar to FIG. 5 showing another embodiment of a seal member included in a shroud segment like that in FIG. 5.

Another embodiment of a seal member 358 as part of a turbine shroud segment 322 is shown in FIG. 13. The turbine shroud segment 322 is similar to the turbine shroud segment 22, and similar numbering in the 300 series is used to identify common elements except as further detailed below. The seal member 358 is a metallic W-shaped spring seal which is formed in an annular configuration to extend along a perimeter edge of a blade track segment 326 of the turbine shroud segment 322.

In the illustrative embodiment, the seal member 358 is folded into two U-shaped channels defining two opposing ends 396 and two peaks 398 as suggested in FIG. 13. While two peaks 398 are shown, more or less peaks may be used. The seal member 358 is formed such that the ends 396 are biased away from one another. In the illustrative embodiment, the seal member 358 is received in a channel 340 formed in a carrier segment 324 of the turbine shroud segment 322. The ends 396 engage with the channel 340 to seal against the carrier segment 324, and the peaks 398 engage and seal against an EBC layer 355 on the blade track segment 326 to seal a cavity 334. In some embodiments, no EBC layer 355 is used and the peaks 398 engage and seal against a runner 352 of the blade track segment 326 to seal the cavity 334. An inlet 331 directs high-pressure air into the channel 340 to block ingress of air from the flow path 17 if the seal is broken. The high-pressure air may energize the seal member 358 to maximize sealing contact.

Figure 14:
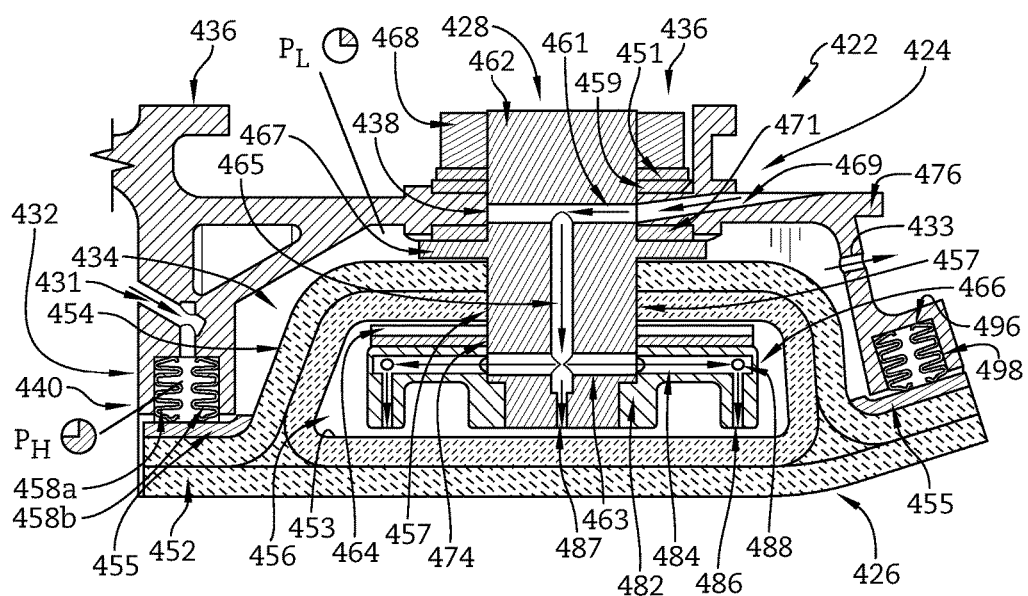
FIG. 14 is a view similar to FIG. 13 showing another embodiment of a seal member included in a shroud segment like that in FIG. 5.

In another embodiment, seal members 458a, 458b are used as part of a turbine shroud segment 422 as shown in FIG. 14. The turbine shroud segment 422 is similar to the turbine shroud segment 22, and similar numbering in the 400 series is used to identify common elements except as further detailed below. The seal member 458 is a metallic multi-fold spring seal which is formed in an annular configuration to extend along a perimeter edge of a blade track segment 426 of the turbine shroud segment 422.

In the illustrative embodiment, the seal members 458a, 458b are each folded into four U-shaped channels defining two opposing ends 496 and four peaks 498 as suggested in FIG. 14. While four peaks 498 are shown, more or less peaks may be used. Each seal member 458a, 458b is formed such that the ends 496 are biased away from one another. The seal members 458a, 458b are received in a channel 440 formed in a carrier segment 424 of the turbine shroud segment 422. The seal members 458a, 458b are spaced apart from one another such that they run along opposing sides of the channel 440 from one another. The ends 496 of each seal member 458a, 458b engage and seal against the channel 440 and an EBC layer 455 on the blade track segment 426, and the peaks 498 engage and seal against the channel 440 to seal a cavity 434. An inlet 431 directs high-pressure air into the channel 440 between the seal members 458a, 458b to block ingress of air from the flow path 17 if the seal is broken. The high-pressure air may energize the seal members 458a, 458b to maximize sealing contact.

In illustrative embodiments, the carrier segments may include end caps configured to receive strip seals. In some such embodiments, a multiple strip seal arrangement may include radially extending strip seals and axially extending strip seals. The axially extending strip seals may be placed along the radial inner and outer edges of the carrier segments. Including a strip seal along the radially outer edge of the carrier can greatly reduce the leakage flow through all of the adjacent strip seals. In some embodiments, a 45% reduction in strip seal flow with the addition of the strip seal along the outer edge of the carrier segments may be achieved. In some embodiments, grooves are formed in the end caps to receive the strip seals.

Compared to Ni alloys for example, CMCs have very low allowable stress values. Blade track segments (sometimes called seal segment) in gas turbine engines can have significant pressure loads. In order to be able to minimally load the seal segment, the pressure in the receiving cavity of a carrier segment can be much lower than the flow path pressure at the same location. Temperature gradients and contact loads can be minimized to accommodate the low strength of CMC material and circumferential span of the seal segments.

In illustrative embodiments, high-pressure buffering passages block hot air ingresses into the low pressured cavity. Use of a dual purpose support/cooling air distribution component can be accommodated the support and cooling of the CMC seal segment. A perimeter seal member (sometimes called a gasket) lays on a thick layer of Environmental Barrier Coating (EBC) to provide a smooth surface for the seal member to seal against. This EBC also acts as a thermal barrier coating, shielding the gasket from high temperatures and reducing the thermal gradient in a perimeter flange of the CMC seal segment.

In illustrative embodiments, a wave spring is positioned between a bridge of the seal segment and a flow distributor of a track-segment coupler to bias the seal segment toward the carrier segment (made of metallic materials, such as Ni alloy for example) for mutual engagement with the perimeter seal member. A metal washer and high temperature compliant gasket are positioned between a metallic nut and the carrier segment. The nut engages with the support shaft to preload the wave spring and gaskets to seal the cavity.

In illustrative embodiments, the perimeter seal member is pressurized through forward ports. A pressure of the seal member at a fore end of shroud is generally higher than the flow path pressure at a similar axial location through the engine (e.g., before the turbine wheel). Likewise a pressure of seal member at an aft end of the shroud is generally higher than the flow path pressure at a similar axial location through the engine (i.e., after the turbine wheel). The latter pressure is sometimes referred to as the pressure sink of the engine.

In illustrative embodiments, the CMC seal segment is drawn up against the gasket by a clamp load from the nut/shaft, exerted through the flow distributor and wave spring. The clamp load of the nut/shaft is split between securing the shaft to the carrier and sealing the gasket along the bottom flange of the CMC seal segment. This allows for the design option of controlling the bending load and stress in the flange of the seal segment. Bending stress in the flange can be controlled by adjusting the load split of the nut/shaft clamp load.

In illustrative embodiments, the wave spring extends circumferentially along the flow distributor between the bridge and the flow distributor. The wave spring may be made of metallic material, such as a Ni alloy for example. The support shaft is coupled to the flow distributor after insertion through the bridge and the wave spring is preloaded by tightening the nut to hold the support shaft and seal segment on the carrier segment. This establishes the contact between the gasket, carrier segment, and seal segment. The seal segment and spring work together spread the load out on the CMC seal segment backside surface and to lower the stress in this component. Additionally, the spring adjusts the stiffness of the system to help the gasket between the carrier and the seal segment maintain contact and sealing.

In illustrative embodiments, the Coefficient of Thermal Expansion (CTE) of Ni alloys is roughly triple the CTE of CMC. As temperatures are applied to the metal carrier segment and CMC seal segment during engine operation, the radii of the metal and CMC surfaces, at the interfaces with the gasket, could differ significantly. This could lead to poor sealing of the gasket and load problems between the carrier and seal segment. By machining the bottom side of the carrier and forming the top surface of the CMC seal segment on different radii or different radius centers when cold, this interface can also be optimized for when the engine is at operating temperatures and pressures. Similarly, the radii of the metal flow distributor and CMC seal segment could differ significantly. This could lead to an uneven loading of the wave spring that is between the flow distributor and seal segment. By machining the flow distributor and/or forming the CMC seal segment on different radii or different radius centers when cold, the contact between the wave spring, the flow distributor, and the seal segment, can also be optimized for when the engine is at operating temperatures and pressures.

In illustrative embodiments, by modifying the wavelength and/or amplitude of the waves of the wave spring, the contact and loading between the wave spring, flow distributor, and seal segment could be optimized for when the engine is at operating temperatures and pressures. For example, the wavelength of the spring could be decreased near the ends of the spring to make the spring stiffer in these regions. Or the amplitude of the spring's waves could be decreased near the middle of the spring to facilitate a contact state that might be desired when the system is at engine operating temperatures and pressures. Other systems of springs can be used to adjust the stiffness of the system, such as coil, leaf, and torsional springs.

In illustrative embodiments, the wave spring could be cut axially along a middle portion thereof to allow for the control of the loads, and therefore the stresses, that are introduced into the CMC seal segment. Due to the hole in the wave spring that accommodates the support shaft, the contact loads imparted by the peak of the one wave of the wave spring at this location can be quite high. Cutting the peak of this one wave reduces its stiffness and the load it generates on the seal segment.

In illustrative embodiments, the carrier segments include an enclosed cavity outward of the CMC seal segment. The perimeter gasket between the carrier and CMC seal segment seals this cavity. The enclosed cavity can be charged with air of a much lower pressure (such as interstage compressor bleed air) than cooling air from other sources (such as compressor discharge air). Using interstage compressor air to cool the seal segment represents a specific fuel consumption (SFC) savings for the engine in that interstage compressor air has less work in it than compressor discharge air. The air being supplied can be as low as a small margin above the pressure sink. In addition to providing a support for the seal segment, the flow distributor distributes cooling air for impingement on the seal segment.

In illustrative embodiments, cooling air following impingement is returned to the flow path through outlet ports in the carrier segment. The size and number of these vent holes can control the pressure in the cavity above the seal segment. Vent holes communicate directly with the flow path pressure. Vent holes can be sized to reduce the cavity pressure to about 5% above flow path pressure, for example. By having a low pressure in this cavity, loading on the seal segment is minimized and maximizes cooling effectiveness from the impingement. The vent holes maximize control over the cavity pressure compared to using seal leakage which can have unknown variables.

In illustrative embodiments, the seal segment support/spring and impingement cooling air assembly provides a largely variable system of contact compliance for the support of the seal segment. A variety of springs and support shapes are available for this system, allowing for a great deal of control of the loads and stresses that are applied to the seal segment. In addition to carrying the seal segment, the flow distributor provides a largely variable system for the impingement, conduction, and convection cooling of the seal segment, carrier segment, and the flow distributor itself. In this way, the thermal stress in the seal segment can be managed to be below the stress allowables of the CMC material.

In illustrative embodiments, the perimeter seal member is fitted in a channel of the carrier segment. The channel includes a high pressure buffer groove to feed high pressure air to the channel in case of gasket failure. The groove includes supply holes for supplying high pressure buffer air to the groove. High-pressure air is used in a fore section of the groove to keep flow path pressure out in the event of gasket failure. For example, this might be compressor discharge air pressure. The perimeter gasket periodically has holes through its thickness so that high-pressure air is available to prevent any flow path ingress along the bottom face of the gasket. Should the gasket fail, compressor discharge air would prevent flow path gasses from entering the cavity of the carrier segment which may be at a pressure below the flow path pressure before the turbine wheel. Also, the gasket is recessed into the carrier segment so that it is restrained, minimizing deformation under pressure and loading.

In illustrative embodiments, forming dams in the groove allows the use of multiple buffer groove pressures. More than one dam can be employed to facilitate additional buffer pressures. By creating a solid dam in this groove, air of different pressures can be used to block ingress into the carrier cavity should there be a gasket failure. This is useful in that the amount of air pressure in each section of buffer groove can be tailored to purge against the flow path pressure at that axial location. This approach minimizes the leakage from the buffer groove, and allows for the use of air in the buffer groove with a lower amount of work invested. For example, lower buffer pressure used in an aft section could be lower work compressor bleed air. Air in this groove would still be some margin over the flow path pressure to block ingress. By employing the vent ports in the carrier, the trailing edge groove could be either eliminated (filled in) or not pressured at all. Not having this trailing edge buffer groove entirely eliminates a source of seal leakage and represents a decrease in SFC. This is all due to keeping the cavity pressure a small margin above the flow path pressure aft of the turbine blade. A low internal cavity pressure compared to the high pressure in the forward portion of the perimeter gasket makes the system less sensitive to variations in leakage of air from this channel.

In illustrative embodiments, springs to enforce sealing contact can be located outside the carrier segment. With a location outside the carrier, temperature control of the springs may be maximized. With the springs located outside the carrier, the height of the bridge of the seal segment can become shorter.

In illustrative embodiments, an W-shaped metallic spring seal is used around the perimeter of the blade track segment. High pressure air is supplied to the buffer groove in the carrier segment in case of seal failure. The pressure of this air would be set at some margin above flow path pressure, to prevent hot air ingress into the cavity of the carrier segment in case of seal failure. This high pressure air also energizes the E seal causing it to seal at the peaks engaged with the blade track segment and the ends of the arms engaged with the groove of the carrier.

In illustrative embodiments, one or more multi-fold metallic spring seals are used around the perimeter of the blade track segment. High pressure air is supplied to the buffer groove in carrier in case of seal failure. The pressure of this air would be set at some margin above flow path pressure, to prevent hot air ingress into the cavity of the carrier segment in case of seal failure. This high pressure air also energizes the multi-fold seals causing them to seal at the ends of the arms; one engaged with the blade track segment and the other engaged with the groove of the carrier.

According to an aspect of the present disclosure, a turbine shroud segment may include a carrier segment comprising metallic materials, a blade track segment comprising ceramic matrix composite materials, and a seal member. The carrier segment may be formed to define an attachment-receiving space. The blade track segment may be formed to include a runner shaped to extend partway around a central axis and an attachment portion that extends radially outward from the runner into the attachment-receiving space channel formed by the carrier segment. A seal member may be configured to resist the movement of gasses into the attachment-receiving space. The seal member may be shaped to extend around the attachment portion of the blade track segment and may be arranged to engage a radially-outwardly facing surface of the runner.

In illustrative embodiments, the seal member may be a one-piece component that extends all the way around the attachment portion of the blade track segment and along a perimeter edge of the runner.

In illustrative embodiments, the seal member may be formed to include a plurality of radially-extending bleed holes adapted to conduct a flow of buffer air through the seal member to resist the movement of gasses into the attachment-receiving space.

In illustrative embodiments, the plurality of bleed holes may be formed only along a leading edge of the blade track segment.

In illustrative embodiments, the seal member may comprise mica.

In illustrative embodiments, the runner of the blade track segment may include a layer of environmental barrier coating that provides the radially-outwardly facing surface of the runner engaged by the seal member.

In illustrative embodiments, the blade track segment may include uncoated portions. The coating applied to a radially-outwardly facing surface of the runner included in the blade track segment may be smoother than the uncoated portions of the blade track segment.

In illustrative embodiments, the carrier segment may include a mount plate and a plurality of receiving walls that extend inwardly in a radial direction from the mount plate toward the central axis. The receiving walls may extend all the way around the attachment portion of the blade track segment. The attachment-receiving space may be defined by the mount plate and the receiving walls. The seal member may extend radially between the receiving walls of the carrier and the runner of the blade track segment to resist the movement of gasses into and out of the attachment-receiving space.

In illustrative embodiments, the plurality of receiving walls may be formed to include seal channels that extends outwardly in the radial direction and the seal channels receive the seal.

In illustrative embodiments, the seal channels may be formed by the receiving walls open into one another and cooperate to form a continuous channel that extends all the way around the attachment portion of the blade track segment.

In illustrative embodiments, the seal member may include at least one metallic member shaped to form at least one U-shaped lobe that defines a pressure-activated channel. The pressure-activated channel may be arranged to open into the seal channels. The seal member may be configured to expanded when pressurized air is supplied to the seal channels.

In illustrative embodiments, the metallic member may be a one-piece component that extends all the way around the attachment portion of the blade track segment and along a perimeter edge of the runner.

In illustrative embodiments, the metallic member may be configured to expand in an axial direction along the central axis when pressurized air is supplied to the seal channels.

In illustrative embodiments, the metallic member may be configured to expand in the radial direction when pressurized air is supplied to the seal channels.

In illustrative embodiments, the seal member may include two metallic members. Each metallic member may be shaped to form at least one U-shaped lobe that defines a pressure-activated channel arranged to open into the seal channels. Each metallic member may be a one-piece component that extends all the way around the attachment portion of the blade track segment.

According to an aspect of the present disclosure, a turbine shroud may include a carrier comprising metallic materials, a blade track comprising ceramic matrix composite materials, and a seal member. The carrier may be formed to define an attachment-receiving space. The blade track may be formed to include a runner shaped to extend at least partway around a central axis and an attachment portion that extends radially outward from the runner into the attachment-receiving space channel formed by the carrier segment. The seal member may be configured to resist the movement of gasses into the attachment-receiving space. The seal member may be arranged to engage a radially-outwardly facing surface of the runner.

In illustrative embodiments, the carrier may include a mount plate and at least one receiving wall that extends inwardly in a radial direction from the mount plate toward the central axis. The at least one receiving wall may be formed to include a seal channel that extends outwardly in the radial direction. The seal channel may be configured to receive the seal member.

In illustrative embodiments, the runner of the blade track may include a layer of environmental barrier coating that provides the radially-outwardly facing surface of the runner engaged by the seal member. The blade track segment may include uncoated portions. The coating applied to the radially-outwardly facing surface of the runner included in the blade track segment may be smoother than the uncoated portions of the blade track segment.

In illustrative embodiments, the seal member may be formed to include a plurality of radially-extending bleed holes adapted to conduct a flow of buffer air through the seal member to resist the movement of gasses into the attachment-receiving space. The plurality of bleed holes may be formed only along a leading edge of the blade track.

In illustrative embodiments, the seal member may comprise mica.

According to an aspect of the present disclosure, a turbine shroud segment adapted for use in a gas turbine engine may include a carrier segment comprising metallic materials, a blade track segment comprising ceramic matrix composite materials, and an attachment assembly. The carrier segment may be formed to include an attachment-receiving space. The blade track segment may be formed to include a runner shaped to extend at least partway around a central axis and an attachment box portion that extends radially outward from the runner into the attachment-receiving space formed by the carrier segment. The attachment assembly may include an attachment post that extends from the carrier segment into the attachment box portion of the blade track segment. The attachment post may be formed to include a post passageway that provides part of a cooling system configured to conduct cooling air into the attachment box portion of the blade track segment to cool the blade track segment when the turbine shroud segment is used in a gas turbine engine.

In illustrative embodiments, the attachment assembly may include an attachment support arranged inside the attachment box portion of the blade track segment that is coupled to the attachment post. The attachment support may be formed to include distribution passageways fluidly coupled to the post passageway formed in the attachment post so that cooling air conducted through the post passageway is distributed to various locations along the blade track segment when the turbine shroud segment is used in a gas turbine engine.

In illustrative embodiments, the distribution passageways may extend axially along the central axis and circumferentially around the central axis.

In illustrative embodiments, the attachment post may extend into the attachment box portion of the blade track segment through an attachment hole formed in the attachment box portion. The attachment support may be sized to block withdrawal of the attachment post out of the attachment box portion.

In illustrative embodiments, the attachment post may include a shaft and support threads formed on the shaft that engage the attachment support to couple the attachment post to the attachment support.

In illustrative embodiments, the distribution passageways may be formed by the attachment support are arranged to discharge cooling air at various locations toward a radially-outwardly facing surface of the runner included in the blade track segment.

In illustrative embodiments, the attachment post may extend through a post hole formed in the carrier segment into the attachment-receiving space formed by the carrier segment and through an attachment hole formed in the attachment box portion of the blade track segment.

In illustrative embodiments, the carrier segment may be formed to include an inlet passageway fluidly coupled to the post passageway formed in the attachment post so that cooling air introduced into the inlet passageway is conducted through the post passageway into the attachment box portion of the blade track segment when the turbine shroud segment is used in a gas turbine engine.

In illustrative embodiments, the attachment box portion included in the blade track segment may define a box interior bounded by a radially-outwardly facing surface of the runner included in the blade track segment so that cooling air conducted into the box interior by the post passageway cools the radially-outwardly facing surface of the runner.

In illustrative embodiments, the box interior defined by the attachment box portion of the blade track segment may be open for fluid communication with the attachment-receiving space formed by the carrier segment and the carrier segment may be formed to include a plurality of vent holes arranged along an aft side of the carrier segment that are configured to conduct used cooling air out of the attachment-receiving space.

According to an aspect of the present disclosure, a turbine shroud segment adapted for use in a gas turbine engine may include a carrier segment comprising metallic materials, a blade track segment comprising ceramic matrix composite materials, and an attachment assembly. The carrier segment may be formed to include an attachment-receiving space. The blade track may be formed to include a runner shaped to extend at least partway around a central axis and an attachment portion that extends radially outward from the runner into the attachment-receiving space formed by the carrier segment. The attachment assembly may include an attachment post that extends from the carrier segment through an attachment hole formed in the attachment portion of the blade track segment and an attachment support coupled to the attachment post to block withdrawal of the attachment post through the attachment hole. The attachment post may be formed to include a post passageway configured to conduct cooling air.

In illustrative embodiments, the attachment post may include a shaft and support threads formed on the shaft that engage the attachment support to couple the attachment post to the attachment support.

In illustrative embodiments, the attachment support may be formed to include distribution passageways fluidly coupled to the post passageway.

In illustrative embodiments, the attachment support may be shaped to extend at least partway around the central axis.

In illustrative embodiments, the distribution passageways may extend axially along the central axis and circumferentially around the central axis.

In illustrative embodiments, the distribution passageways formed by the attachment support may be arranged to discharge cooling air at various locations toward a radially-outwardly facing surface of the runner included in the blade track segment.

In illustrative embodiments, the attachment post may extend through a post hole formed in the carrier segment into the attachment-receiving space formed by the carrier segment.

In illustrative embodiments, the carrier segment may be formed to include an inlet passageway fluidly coupled to the post passageway formed in the attachment post.

In illustrative embodiments, the carrier segment may be formed to include a plurality of vent holes that extend out of the attachment-receiving space configured to conduct used cooling air out of the attachment-receiving space.

In illustrative embodiments, the plurality of vent holes may be arranged along an aft side of the carrier segment.

According to an aspect of the present disclosure, a turbine shroud segment may include a carrier segment comprising metallic materials, a blade track segment comprising ceramic matrix composite materials, and a seal member. The carrier segment may include a mount plate and a plurality of receiving walls that extend inwardly in a radial direction from the mount plate toward a central axis to define an attachment-receiving space. The blade track segment may be formed to include a runner shaped to extend partway around a central axis and an attachment portion that extends radially outward from the runner into the attachment-receiving space channel formed by the carrier segment. The seal member may extend radially between the receiving walls of the carrier segment and the runner of the blade track segment to resist the movement of gasses into the attachment-receiving space. At least one of the receiving walls included in the carrier segment may be formed to include buffer air passageways configured to discharge buffer air along the seal member to resist the movement of gasses into the attachment-receiving space.

In illustrative embodiments, the buffer air passageways may be arranged along an axially forward side of the carrier segment.

In illustrative embodiments, the plurality of receiving walls may be formed to include a seal channel that extends outwardly in the radial direction and the seal channel receives the seal member.

In illustrative embodiments, the seal channel formed by the receiving walls may extend all the way around the attachment portion of the blade track segment.

In illustrative embodiments, the buffer air passageways may be located to discharge buffer air into the seal channel formed by the receiving walls.

In illustrative embodiments, the plurality of receiving walls of the carrier segment may be formed to include at least one buffer groove that extends outwardly in the radial direction into the receiving walls. The at least one buffer groove may be arranged radially outward of at least a portion of the seal member. The buffer air passageways may be located to discharge buffer air into the at least one buffer groove formed by the receiving walls.

In illustrative embodiments, the plurality of receiving walls may be formed to include a seal channel that receives the seal member. The buffer groove may be smaller than the seal channel. The buffer groove may extend outward in the radial direction from the seal channel.

In illustrative embodiments, the receiving walls of the carrier segment may be formed to include at least one buffer dam that extends into the buffer groove and the buffer dam may be sized to restrict the flow of buffer air through the buffer groove so that different portions of the buffer groove are pressurized at different levels when buffer air is supplied to the buffer groove from the buffer air passageways.

In illustrative embodiments, the buffer groove may extend all the way around the attachment-receiving space defined by the carrier segment.

In illustrative embodiments, the seal member may be formed to include a plurality of radially-extending bleed holes adapted to conduct buffer air through the seal member.

In illustrative embodiments, the plurality of bleed holes may be formed only along a leading edge of the blade track segment.

In illustrative embodiments, the plurality of bleed holes may each be aligned with a buffer air passageway formed in the carrier segment to receive buffer air being conducted through the buffer air passageway.

According to an aspect of the present disclosure, a turbine shroud segment may include a carrier segment comprising metallic materials, a blade track segment comprising ceramic matrix composite materials, and a seal member. The carrier segment may include a mount plate and a wall that extends inwardly in a radial direction from the mount plate toward a central axis. The blade track segment may be formed to include a runner shaped to extend partway around a central axis. The seal member may extend radially between the wall of the carrier segment and the runner of the blade track segment to resist the movement of gasses between the wall of the carrier segment and the runner of the blade track segment. The wall included in the carrier segment may be formed to include a plurality of buffer air passageways configured to discharge buffer air along the interface of the carrier segment and the seal member.

In illustrative embodiments, the wall of the carrier segment may be formed to include a buffer groove that extends outwardly in the radial direction. The buffer groove may be arranged radially outward of at least a portion of the seal member. The buffer air passageways may be located to discharge buffer air into the buffer groove.

In illustrative embodiments, the wall may be formed to include a seal channel that receives the seal. The buffer groove may be smaller than the seal channel. The buffer groove may extend outward in the radial direction from the seal channel.

In illustrative embodiments, the wall of the carrier segment may be formed to include at least one buffer dam that extends into a buffer groove and the buffer dam may be sized to restrict the flow of buffer air along the buffer groove so that different portions of the buffer groove are pressurized at different levels when buffer air is supplied to the buffer groove from the buffer air passageways.

In illustrative embodiments, the seal member may be formed to include a plurality of radially-extending bleed holes adapted to conduct buffer air through the seal member.

In illustrative embodiments, the plurality of bleed holes may be formed only along a leading edge of the blade track segment.

In illustrative embodiments, the plurality of bleed holes may be each aligned with a buffer air passageway formed in the carrier segment to receive buffer air being conducted through the buffer air passageway.

In illustrative embodiments, the plurality of buffer air passageways may be formed only along a leading edge of the wall included in the carrier segment.

According to an aspect of the present disclosure, a turbine shroud segment adapted for use in a gas turbine engine may include a carrier segment comprising metallic materials, a blade track segment comprising ceramic matrix composite materials, and an attachment assembly. The carrier segment may be formed to include an attachment-receiving space. The blade track segment may be formed to include a runner shaped to extend at least partway around a central axis and an attachment portion that extends radially outward from the runner into the attachment-receiving space formed by the carrier segment. The attachment assembly may include an attachment post that extends from the carrier segment through an attachment hole formed in the attachment portion of the blade track segment. An attachment support may be coupled to the attachment post to block withdrawal of the attachment post through the attachment hole. A load distributor may be configured to distribute clamp force applied by the attachment post and the attachment support along the attachment portion of the blade track segment.

In illustrative embodiments, the load distributor may include a wave spring arranged radially between the attachment portion of the blade track segment and the attachment support of the attachment assembly.

In illustrative embodiments, the wave spring may be formed to include waves having a varying frequency along the length of the wave spring.

In illustrative embodiments, the waves of the wave spring may vary in frequency as the wave spring extends away from the attachment post.

In illustrative embodiments, the waves of the wave spring may have a varying amplitude along the length of the wave spring.

In illustrative embodiments, the wave spring may be formed to include waves having a varying amplitude along the length of the wave spring.

In illustrative embodiments, the waves of the wave spring may increase in amplitude as the wave spring extends away from the attachment post.

In illustrative embodiments, the attachment post may extend through an aperture formed in the wave spring.

In illustrative embodiments, the load distributor may include a first wave spring and a second wave spring. The first wave spring may be arranged to extend circumferentially from the attachment post in a first direction and may be located radially between the attachment portion of the blade track segment and the attachment support of the attachment assembly. The second wave spring may be arranged to extend circumferentially from the attachment post in a second direction, opposite the first direction, and may be located radially between the attachment portion of the blade track segment and the attachment support of the attachment assembly.

In illustrative embodiments, the first wave spring may be formed to include a notch through which a portion of the attachment post extends and the second wave spring is formed to include a notch through which a portion of the attachment post extends.

According to an aspect of the present disclosure, a turbine shroud segment adapted for use in a gas turbine engine may include a carrier segment comprising metallic materials, a blade track segment comprising ceramic matrix composite materials, and an attachment assembly. The carrier segment may be formed to include an attachment-receiving space. The blade track segment may be formed to include a runner shaped to extend at least partway around a central axis and an attachment portion that extends radially outward from the runner into the attachment-receiving space formed by the carrier segment. The attachment assembly may include a first attachment post that extends from the carrier segment through an attachment hole formed in the attachment portion of the blade track segment, a first attachment support arranged inside a cavity formed by the attachment portion of the blade track segment and coupled to the first attachment post to block withdrawal of the attachment post through the attachment hole, and a first spring member arranged outside of the attachment-receiving space and configured to pull the first attachment support radially outward away from the central axis.

In illustrative embodiments, the first spring member may be arranged radially outward of the carrier segment.

In illustrative embodiments, the first spring member may be a coil spring that engages a radially-outwardly facing surface of the carrier segment.

In illustrative embodiments, the first attachment support may extend circumferentially within the cavity formed by the attachment portion of the blade track segment.

In illustrative embodiments, the first attachment support may be yoke-shaped and contacts the attachment portion of the blade track segment at locations spaced apart from the attachment hole formed in the attachment portion of the blade track segment.

In illustrative embodiments, the attachment assembly may include a second attachment post that extends from the carrier segment through an attachment hole formed in the attachment portion of the blade track segment, a second attachment support arranged inside a cavity formed by the attachment portion of the blade track segment and coupled to the second attachment post to block withdrawal of the second attachment post through the attachment hole, and a second spring member arranged outside of the attachment-receiving space and configured to pull the second attachment support radially outward away from the central axis.

In illustrative embodiments, the first attachment post, the first attachment support, and the first spring member may be spaced circumferentially apart from the second attachment post, the second attachment support, and the second spring member.

In illustrative embodiments, the first attachment post, the first attachment support, and the first spring member may be spaced axially apart from the second attachment post, the second attachment support, and the second spring member.

In illustrative embodiments, the first attachment post, the first attachment support, and the first spring member may be spaced axially apart from the second attachment post, the second attachment support, and the second spring member.

In illustrative embodiments, the first attachment support included in the attachment assembly may be arranged inside a first cavity formed by the attachment portion of the blade track segment and the second attachment portion of the attachment assembly may be arranged inside a second cavity formed by the attachment portion of the blade track segment.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud segment adapted for use in a gas turbine engine, the turbine shroud segment comprising
a carrier segment comprising metallic materials, the carrier segment formed to include an attachment-receiving space,
a blade track segment comprising ceramic matrix composite materials, the blade track segment formed to include a runner shaped to extend at least partway around a central axis and an attachment box portion that extends radially outward from the runner into the attachment-receiving space formed by the carrier segment, and
an attachment assembly including an attachment post that extends from the carrier segment into the attachment box portion of the blade track segment, the attachment post formed to include a post passageway that provides part of a cooling system configured to conduct cooling air into the attachment box portion of the blade track segment to cool the blade track segment when the turbine shroud segment is used in a gas turbine engine, wherein the attachment box portion included in the blade track segment defines a box interior bounded by a radially-outwardly facing surface of the runner included in the blade track segment so that cooling air conducted into the box interior by the post passageway cools the radially-outwardly facing surface of the runner, and wherein the box interior defined by the attachment box portion of the blade track segment is open for fluid communication with the attachment-receiving space formed by the carrier segment and the carrier segment is formed to include a plurality of vent holes configured to conduct used cooling air out of the attachment-receiving space.

2. The turbine shroud segment of claim 1, wherein the distribution passageways extend axially along the central axis and circumferentially around the central axis.

3. The turbine shroud segment of claim 1, wherein the attachment post extends into the attachment box portion of the blade track segment through an attachment hole formed in the attachment box portion and the attachment support is sized to block withdrawal of the attachment post out of the attachment box portion.

4. The turbine shroud segment of claim 1, wherein the attachment post includes a shaft and support threads formed on the shaft that engage the attachment support to couple the attachment post to the attachment support.

5. The turbine shroud segment of claim 1, wherein the distribution passageways formed by the attachment support are arranged to discharge cooling air at various locations toward a radially-outwardly facing surface of the runner included in the blade track segment.

6. The turbine shroud segment of claim 1, wherein the attachment post extends through a post hole formed in the carrier segment into the attachment-receiving space formed by the carrier segment and through an attachment hole formed in the attachment box portion of the blade track segment.

7. The turbine shroud segment of claim 1, wherein the plurality of vent holes are arranged along an aft side of the carrier segment.

8. A turbine shroud segment adapted for use in a gas turbine engine, the turbine shroud segment comprising
   a carrier segment comprising metallic materials, the carrier segment formed to include an attachment-receiving space,
   a blade track segment comprising ceramic matrix composite materials, the blade track segment formed to include a runner shaped to extend at least partway around a central axis and an attachment box portion that extends radially outward from the runner into the attachment-receiving space formed by the carrier segment, and
   an attachment assembly including an attachment post that extends from the carrier segment into the attachment box portion of the blade track segment, the attachment post formed to include a post passageway that provides part of a cooling system configured to conduct cooling air into the attachment box portion of the blade track segment to cool the blade track segment when the turbine shroud segment is used in a gas turbine engine, wherein the carrier segment is formed to include an inlet passageway fluidly coupled to the post passageway formed in the attachment post so that cooling air introduced into the inlet passageway is conducted through the post passageway into the attachment box portion of the blade track segment when the turbine shroud segment is used in a gas turbine engine.

9. The turbine shroud segment of claim 8, wherein the attachment box portion included in the blade track segment defines a box interior bounded by a radially-outwardly facing surface of the runner included in the blade track segment so that cooling air conducted into the box interior by the post passageway cools the radially-outwardly facing surface of the runner, and wherein the box interior defined by the attachment box portion of the blade track segment is open for fluid communication with the attachment-receiving space formed by the carrier segment and the carrier segment is formed to include a plurality of vent holes configured to conduct used cooling air out of the attachment-receiving space.

10. A turbine shroud segment adapted for use in a gas turbine engine, the turbine shroud segment comprising
    a carrier segment comprising metallic materials, the carrier segment formed to include an attachment-receiving space,
    a blade track segment comprising ceramic matrix composite materials, the blade track segment formed to include a runner shaped to extend at least partway around a central axis and an attachment portion that extends radially outward from the runner into the attachment-receiving space formed by the carrier segment, and
    an attachment assembly including an attachment post that extends from the carrier segment through an attachment hole formed in the attachment portion of the blade track segment and an attachment support coupled to the attachment post to block withdrawal of the attachment post through the attachment hole, wherein the carrier segment is formed to include a plurality of vent holes that extend out of the attachment-receiving space configured to conduct used cooling air out of the attachment-receiving space.

11. The turbine shroud segment of claim 10, wherein the attachment post includes a shaft and support threads formed on the shaft that engage the attachment support to couple the attachment post to the attachment support.

12. The turbine shroud segment of claim 10, wherein the attachment support is shaped to extend at least partway around the central axis.

13. The turbine shroud segment of claim 12, wherein the distribution passageways extend axially along the central axis and circumferentially around the central axis.

14. The turbine shroud segment of claim 12, wherein the distribution passageways formed by the attachment support are arranged to discharge cooling air at various locations toward a radially-outwardly facing surface of the runner included in the blade track segment.

15. The turbine shroud segment of claim 10, wherein the attachment post extends through a post hole formed in the carrier segment into the attachment-receiving space formed by the carrier segment.

16. The turbine shroud segment of claim 15, wherein the carrier segment is formed to include an inlet passageway fluidly coupled to the post passageway formed in the attachment post.

17. The turbine shroud of claim 10, wherein the plurality of vent holes are arranged along an aft side of the carrier segment.

* * * * *